Oct. 17, 1961        D. L. ELAM        3,005,110
POWER SUPPLY
Filed July 30, 1958
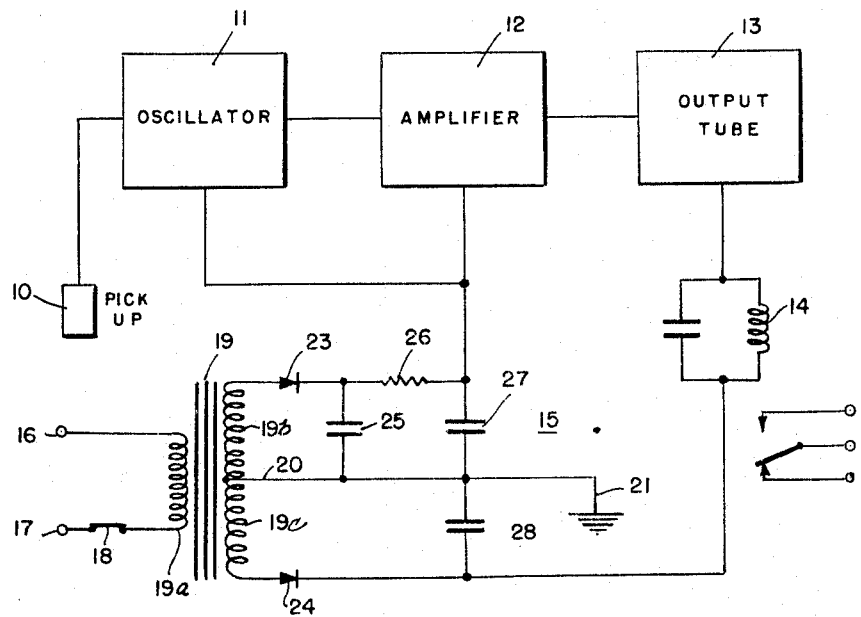
INVENTOR:
DAVID L. ELAM
BY
Schroeder, Hofgren, Brady & Wegner
ATT'YS

United States Patent Office 3,005,110
Patented Oct. 17, 1961

3,005,110
POWER SUPPLY
David L. Elam, Roselle, Ill., assignor to Electro Products Laboratories, Inc., a corporation of Illinois
Filed July 30, 1958, Ser. No. 751,919
3 Claims. (Cl. 307—41)

This invention relates to a power supply circuit, and more particularly to a power supply having isolated portions for supplying a plurality of loads, at least part of which are sensitive to voltage variations.

The problem with which the present invention is concerned may readily be appreciated by a consideration of the sensing system disclosed and claimed in applicant's copending application, Serial No. 481,146, filed January 11, 1955, Patent No. 2,883,538; Reissue Patent No. Re. 24,779, issued February 9, 1960. In this sensing circuit, which is designed to detect the presence or absence of conductive objects within the field of the pickup, an oscillator is provided which has a tuned circuit including an inductor in the pickup. When there is no conductive object in the field of the pickup, the oscillator operates, but when a conductive object is in the field of the pickup, oscillations are squelched. An indicator circuit is responsive to the condition of the oscillator, including a tube which is cut off when the oscillator operates, and conducts heavily, energizing a relay, when the oscillator is inoperative. Both the oscillator and the output circuits are energized from a single power supply, the output voltage of which varies markedly depending upon whether the indicating circuit is conducting or not. This variation in power supply voltage affects the sensitivity of the oscillator circuit, causing a change in the conditions required in the sensitive area of the pickup to stop or start oscillations. Economic considerations make a complicated and expensive stabilized power supply for this type of unit undesirable.

A principal object of the present invention is to provide a novel power supply circuit having a plurality of portions which are operated independently of each other, preventing interaction between the loads applied to each portion.

One feature of the invention is the provision of an electrical circuit including first and second loads, at least one of which is sensitive to supply voltage variations, and a power source for supplying the loads, having a first portion for one load and a second portion for the other, with the two portions being operated independently, preventing interaction between the loads.

Another feature is that the power source operates from alternating current, supplying direct current to the loads and includes first and second rectifiers which are oppositely phased to conduct on alternate half cycles of the alternating supply current, one rectifier supplying the first load, and the other supplying the second load.

A further feature is that the power source includes a transformer having a primary winding connected with a source of alternating current, and having two secondary windings with a common terminal, and a rectifier connected with the other terminal of each of the secondary windings, the rectifiers being oppositely phased to conduct on alternate half cycles, each rectifier supplying one of the loads.

Further features and advantages of the invention will readily be apparent from the following specification and from the drawing, which is a circuit diagram, partially in block form and partially schematic, of a system embodying the invention.

While the power supply of the present invention is described herein as a part of a specific sensing system, and it is especially suited for such use, it will be obvious to those skilled in the art that the circuit has many other uses, particularly with loads having a high variation in current demand and including an element that is sensitive to voltage changes.

The single figure of the drawing is a diagram of a power supply having isolated portions for supplying a plurality of loads.

Turning now to the drawing, the major elements of the sensing circuit disclosed and claimed in the aforementioned Elam application are indicated in block form. Pickup 10 is connected with oscillator 11, and includes the inductive element of the tuned circuit for the oscillator. The output of the oscillator (a continuous wave of oscillations when the oscillator is operating) is coupled through an amplifier 12 to an output stage 13. With the oscillator operating, the oscillations from amplifier 12 are utilized to provide a bias signal keeping output tube 13 cut off. However, when oscillation ceases, as when a conductive object enters the field of pickup 10, output tube conducts, energizing relay 14 and providing a desired indication in suitable circuits connected with the contacts associated therewith.

The power supply 15 for the sensing circuit is energized from a suitable source of power as 110 volts A.C., connected with terminals 16 and 17. The alternating power source is connected through power switch 18 with primary winding 19a of power transformer 19. The power transformer has a secondary winding divided into two portions, 19b and 19c with a common terminal 20 which is returned to a reference potential or ground 21. Rectifiers 23 and 24 are connected with the other terminals of windings 19b and 19c, respectively, in such a manner that they conduct alternately, i.e., on one half cycle rectifier 23 conducts and on the next half cycle rectifier 24 conducts.

Associated with rectifier 23 is a capacitor input filter including capacitor 25, series resistor 26 and shunt output capacitor 27. Direct current power for oscillator 11 and amplifier 12 are obtained across capacitor 27. Rectifier 24 is provided with a single shunt filter capacitor 28, returned to ground 21. The direct current power for output tube 13 is obtained from rectifier 24, across capacitor 28.

Power for the oscillator 11 and amplifier 12 is obtained solely from rectifier 23, which operates on onehalf of each cycle of the source voltage. Power for output tube 13 is obtained solely from rectifier 24 which operates on the alternate half cycles. With this arrangement, there can be no interaction between the two load circuits, i.e., the oscillator and amplifier on the one hand and the output tube on the other. Each load operates independently of the other and obtains its power from alternate half cycles of the supply voltage. Accordingly, the supply voltage for the oscillator is maintained relatively stable, although the supply voltage applied to the output tube drops markedly when it conducts.

While I have shown and described certain embodiments of my invention, it is to be understood that it is capable of many modifications. Changes therefore, in the construction and arrangement may be made without departing from the spirit and scope of the invention as disclosed in the appended claims.

I claim:
1. An electrical circuit comprising: a first load; a second load, one of said loads being sensitive to supply voltage variations and the other requiring widely varying current; a power transformer having a primary winding connected with a source of alternating current, and having a pair of secondary windings with a common terminal; a first rectifier connected with the other terminal of one of said windings for supplying direct current to one of said loads; and a second rectifier connected to the other terminal of the other of said windings for supplying direct current to the second of said loads, said rectifiers being oppositely phased to conduct on alternate half cycles, preventing interaction between said loads.

2. An electronic sensing system, comprising: a sensing circuit subject to variations in sensitivity upon variation of the supply potential applied thereto; an indicating circuit having a first condition and a second condition responsive to said sensing circuit, the current drawn by said indicating circuit from a power source varying widely in amplitude depending on its condition; and a power source operating from alternating current, supplying direct current to said loads, said power source having a first portion, including a rectifier, for the sensing circuit, and a second portion, including a second rectifier, for the indicating circuit, said rectifiers being oppositely phased to conduct on alternate half cycles of the alternating current, preventing interaction between said sensing and indicating circuits.

3. An electronic sensing system, comprising: a sensing circuit subject to variations in sensitivity upon variation of the supply potential applied thereto; an indicating circuit having a first condition and a second condition responsive to said sensing circuit, the current drawn by said indicating circuit from a power source varying widely in amplitude depending on its condition; a power transformer having a primary winding connected with a source of alternating current, and having a pair of secondary windings with a common terminal; a first rectifier connected with the other terminal of one of said windings for supplying direct current to said sensing circuit; and a second rectifier connected to the other terminal of the other of said windings for supplying direct current to said indicating circuit, said rectifiers being oppositely phased to conduct on alternate half cycles, preventing interaction between said indicating and sensing circuits.

References Cited in the file of this patent
UNITED STATES PATENTS

| | | |
|---|---|---|
| 2,134,710 | Eitel et al. | Nov. 1, 1938 |
| 2,342,239 | Becker | Feb. 22, 1944 |
| 2,541,093 | Page | Feb. 13, 1951 |
| 2,548,790 | Higinbotham | Apr. 10, 1951 |
| 2,704,332 | La Fleur | Mar. 15, 1955 |
| 2,721,946 | Weisberger et al. | Oct. 25, 1955 |